(12) United States Patent
Bender

(10) Patent No.: US 6,596,995 B1
(45) Date of Patent: Jul. 22, 2003

(54) REMOTE SENSING OF MOLTEN METAL PROPERTIES

(76) Inventor: Manfred Bender, 620 Cole Pl., Beverly Hills, CA (US) 90212

( * ) Notice: Subject to any disclaimer, the term of this patent is extended or adjusted under 35 U.S.C. 154(b) by 0 days.

(21) Appl. No.: 10/093,874

(22) Filed: Mar. 7, 2002

(51) Int. Cl.[7] ................................................ G01J 5/02
(52) U.S. Cl. ...................... 250/341.6; 75/382; 374/139
(58) Field of Search ...................... 250/338.1, 339.01, 250/341.1, 341.6; 75/382, 375, 384; 374/125, 139, 130, 131, 208; 266/88

(56) References Cited

U.S. PATENT DOCUMENTS 4,730,925 A * 3/1988 Chiba et al. ................. 356/311
6,172,367 B1 * 1/2001 Fritz et al. .................. 250/341.6

* cited by examiner

*Primary Examiner*—Constantine Hannaher
*Assistant Examiner*—Timothy Moran

(57) ABSTRACT

Provided are methods and apparatuses for the sensing of a property of a molten metal that lies beneath layers of interfering matter. A stream of gas is propelled into the layers of interfering matter at a velocity that is sufficient for the gas to penetrate through the layers of interfering matter and into the molten metal, thereby providing an opening through the layers of interfering matter. At the same time, energy emanating from the molten metal is detected and measured through the opening, so as to obtain an energy measurement. Then, the energy measurement is processed to determine a value for the desired property of the molten metal.

13 Claims, 2 Drawing Sheets

REMOTE SENSING OF MOLTEN METAL PROPERTIES

BACKGROUND OF THE INVENTION

1. Field of the Invention

The present invention relates to the measurement of properties of molten metals and is particularly applicable to steel manufacturing.

2. Description of the Related Art

During steel manufacturing, it often is desirable to know the temperature, composition or other physical property of the molten steel in the furnace. However, directly measuring such properties typically is difficult, due both to the very high temperature of the molten metal and to the existence of a layer of slag, which forms on top of the molten metal and the gaseous environment above the layer of slag.

The most common conventional approach to measuring properties of a molten metal is to insert a lance directly into the molten metal bath. For example, when measuring temperature the lance typically will be provided with one or more thermocouples and immersed through the slag and into the molten metal. Unfortunately, due to the high temperature of the molten metal, such lances usually degrade quickly, making such measurements difficult and expensive to obtain.

What is needed, therefore, is a quick, relatively inexpensive technique for measuring properties of molten metal.

SUMMARY OF THE INVENTION

Generally speaking, the present invention addresses this need by using a stream of gas to open a hole through the slag layer, the gaseous layer and/or any other interference matter, thus permitting remote sensing of various properties of the molten metal. In one particular aspect, the invention is directed to the sensing of a property of a molten metal that lies beneath a layer of interfering matter. A stream of gas is propelled into the layer of interfering matter at a velocity that is sufficient for the gas to penetrate through the layer of interfering matter and into the molten metal, thereby providing an opening through the layer of interfering matter. At the same time, energy emanating from the molten metal is detected and measured through the opening, so as to obtain an energy measurement. Then, the energy measurement is processed to determine a value for the desired property of the molten metal.

By virtue of this arrangement, a property of the molten metal can be measured without the necessity of immersing a probe into the molten metal itself. As a result, it generally will be possible to reuse the sensor for a far greater number of measurements than would be possible with conventional sensors.

According to one embodiment of the above technique, the temperature of the molten metal is measured by sensing the infrared radiation emanating from the molten metal, or by using any similar pyrometric evaluation technique. In addition to passively detecting radiation from the molten metal, a sensor assembly can be utilized that includes both a sensor and a source of probe energy, whereby the sensor detects and measures the molten metal's response to such probe energy. For example, a laser and corresponding sensor might be provided for the performance of laser-induced breakdown spectroscopy.

In a further aspect, the invention is directed to the sensing of a property of a molten metal that lies beneath a layer of interfering matter. A stream of gas is propelled and, simultaneously, energy is detected and measured along a line of sight, so as to obtain an energy measurement. The line of sight for such energy detection lies within the stream of gas. Lastly, the energy measurement is processed to determine a value for a specified physical parameter.

This arrangement can permit measurement of certain parameters in the presence of interfering matter, such as slag, where conventional techniques would be inadequate.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

Figure 1:
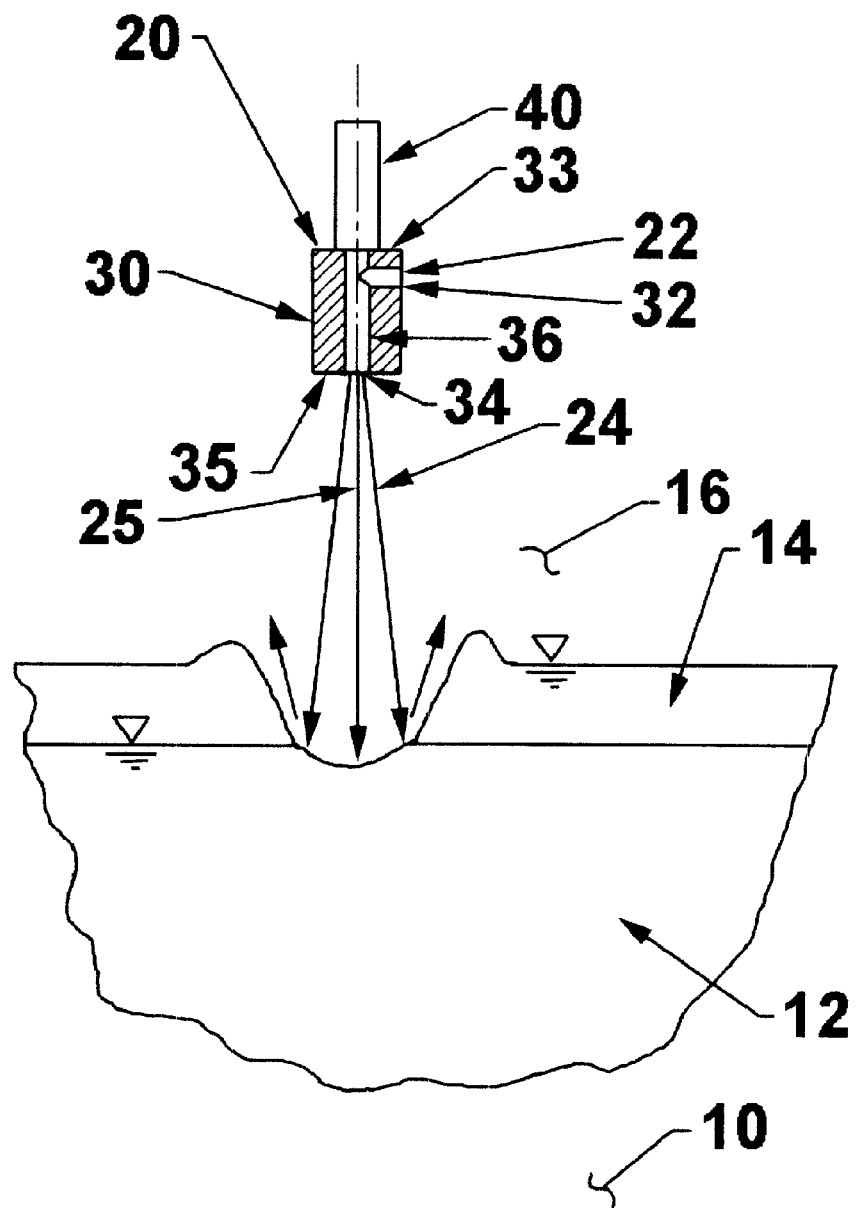
FIG. 1 is a cross-sectional view of system for measuring properties of a molten metal according to a representative embodiment of the present invention.

FIG. 1 illustrates a cross-sectional view of a system 10 for remotely sensing one or more properties of molten metal 12 that is obscured by a layer of slag 14, various atmospheric gases 16, or any other interfering matter. In the preferred embodiment of the invention, molten metal 12 is molten steel, although the present invention may be used with other types of metal as well. It is noted that steel is more difficult to work with than most other common metals due to the higher temperatures required to melt steel. In order to accomplish such remote sensing, an apparatus 20 is provided that includes a nozzle 30 and an attached sensor assembly 40.

The nozzle 30 has an inlet 32 on its side for receiving pressurized gas 22 and an outlet 34 on its front end 35 for outputting a stream 24 of the input gas 22.

The sensor assembly 40 is attached to nozzle 30 at the rear end 33 of nozzle 30, and nozzle 30 includes a channel 36 that is capable of transmitting energy of a desired type from its rear end 33 to its front end 35, as described in more detail below. Also as described in more detail below, sensor assembly 40 includes a sensor and may include a laser or other source of probe energy.

In operation, nozzle 30 directs pressurized gas 22 into a stream 24, which pushes aside any ambient gases 16, impinges on the surface of the slag 14, pushing aside the slag 14 in the same manner, and penetrates into the molten metal 12. As a result of this action of gas stream 24, a direct path 25 (corresponding to at least a portion of gas stream 24) between nozzle 30 and molten metal 12, occupied primarily by the gas 22, is provided.

Due to the configuration of nozzle 30 and, in particular, the existence of channel 36, energy can be transmitted from molten metal 12 along path 25 to sensor assembly 40 and, in certain embodiments, from sensor assembly 40 along path 25 to molten metal 12.

Preferably, gas 22 is selected based upon a number of criteria. First, gas 22 should not unduly react with molten metal 12, slag 14 or atmosphere 16. Second, gas 22 should not unduly attenuate, distort or interfere with any energy desired to be transmitted between sensor assembly 40 and molten metal 12. Thus, for example, where sensor assembly 40 is intended to detect infrared energy emanating from molten metal 12, any of a number of different inert gases could be used for gas 22. However, it is noted that by adequately limiting the exposure of molten metal 12 to gas 22 (e.g., as discussed below), it is presently contemplated that ordinary or ambient air could be used for gas 22 in most embodiments of the invention.

Typically, the pressure at which gas 22 is applied to nozzle 30 is selected based on: the type of gas 22, the configuration of nozzle 30, requirements of sensor assembly 40, the distance between nozzle 30 and the surface of slag layer 14, and the anticipated depth and density of slag layer 14. In the preferred embodiment of the invention, the velocity of gas 22 is just sufficient to penetrate slag layer 14, but not so great as to penetrate too deeply into molten metal 12. In this regard, use of excess pressure or excess gas volume might be a particular problem where sensor assembly 40 is measuring the temperature of molten metal 12, because any gas 22 reaching molten metal 12 generally will have a cooling effect, and the greater the mass of gas 22 projected into molten metal 12, the greater this cooling effect will be. In addition, use of excess gas might also result in increased oxidation or other undesirable reactions.

It is noted that the stream 24 of gas 22 may impinge upon the surface of slag layer 14 at any angle. However, it is currently contemplated that causing stream 24 to be approximately perpendicular to the surface of slag layer 14 will be optimal.

Figure 2:
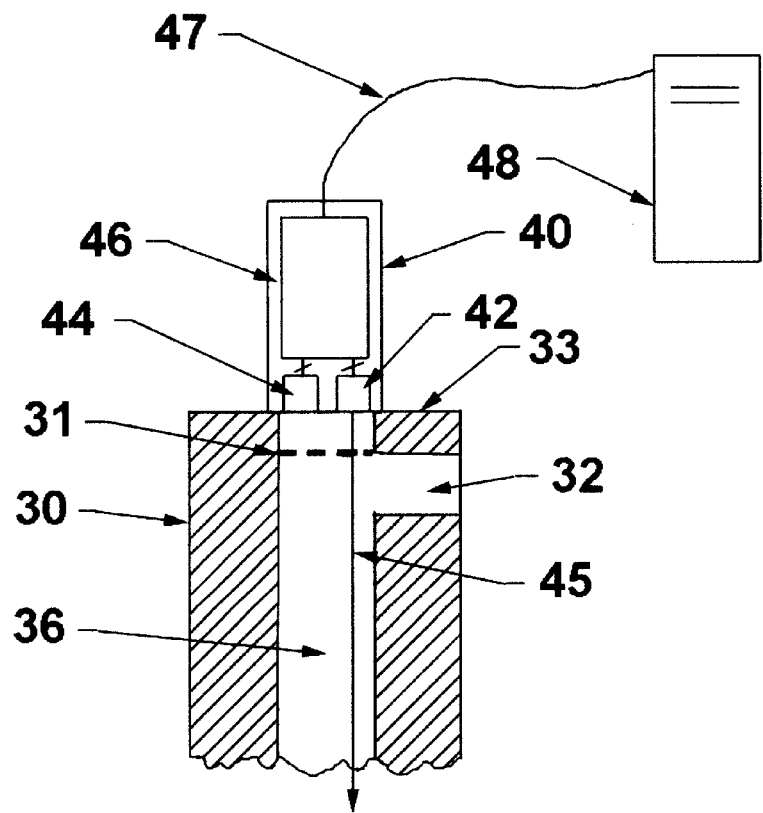
FIG. 2 is a cross-sectional view of a sensor and nozzle assembly according to a representative embodiment of the present invention.

FIG. 2 illustrates an enlarged and more detailed cross-sectional view of nozzle 30 and sensor assembly 40. As can be seen in FIG. 2, gas 22 entering nozzle 30 at inlet 32 fills channel 36, which is closed at or near rear end 33 (and/or at plane 31), and therefore is forced to exit through the front end 35 (not shown in FIG. 2) of nozzle 30. It is noted that the closure that prevents gas 22 from entering sensor assembly 40 may be provided by nozzle 30, sensor assembly 40, or both, as long as no escape path through rear end 33 exists (unless desired for some other purpose).

The length, width and precise configuration of channel 36 may be selected to control the desired properties of gas stream 24 (e.g., velocity of gas 22 and shape of gas stream 24), according to principles known to those skilled in the art. Although the general configuration of channel 36 shown in FIG. 1 is preferred, other variations are possible, such as: eliminating the gap between plane 31 and rear end 33, closing channel 36 at plane 31, tapering channel 36 along its length, rounding edges to improve gas flow, or the use of any alternate design to accomplish the purpose described herein (e.g., an entirely straight channel, with inlet 32 disposed at the rear end 33 of nozzle 30, next to sensor assembly 40).

In the current embodiment of the invention, sensor assembly 40, attached to the rear end 33 of nozzle 30, includes two elements: a source of probe energy 42 and a receiving sensor 44. However, in alternate embodiments of the invention it is possible: (i) to omit probe energy source 42 altogether and only utilize a receiving sensor 44; (ii) to utilize multiple (either similar or different) receiving sensors 44, but no probe energy source 42; or (iii) to utilize multiple (again, either similar or different) receiving sensors 44 and one or more probe energy sources 42, all depending upon the specific properties that the user wishes to measure. When used, probe energy source 42 transmits energy along a line of sight 45 that lies within gas stream 24, at least from opening 34 until such energy reaches molten metal 12. The response of the molten metal 12 can then be detected by sensor 44 along a line of sight (not shown) that also lies within gas stream 24, again at least between opening 34 and molten metal 12.

Typically, probe energy source 42 will be a laser for providing laser-induced breakdown spectroscopy of the molten metal. However, other types of lasers may be used instead for probe energy source 42. In addition, any other type of probe energy source 42 might instead be used, such as an acoustic energy source or a particle beam source, again depending upon the specific property to be measured.

Similarly, a wide variety of different sensors 44 may be employed in the present invention, depending upon the property to be measured. In embodiments where no probe energy source 42 is used, sensor 44 most often will be an infrared detector for measuring the temperature of molten metal 12. However, other types of sensors might instead (or in addition) be utilized in such embodiments, such as a spectrometer or other device for measuring components of the electromagnetic energy radiated by molten metal 12 or an optical sensor for providing still or moving images of the molten metal.

In embodiments where a probe energy source 42 is utilized, sensor 44 typically will be matched to probe energy source 42 and, therefore may be, for example, a spectrometer (or other device for resolving spectral components of incoming energy), a particle beam detector, a Doppler laser receiver, or a microphone or other audio sensor. In either type of embodiment, sensor 44 might be purely optical or might include electronic, chemical or biological processing components.

Preferably, both probe energy source 42 (if provided) and sensor 44 are aligned with gas stream 24, such that each has a line of sight that lies within and is collimated with gas stream 24. It is noted that, due to the configuration of nozzle 30 as shown in FIGS. 1 and 2, the path between each of probe energy source 42 and sensor 44, on the one hand, and outlet 34 of nozzle 30, on the other, is a straight line. However, this is not necessary and in alternate embodiments of the invention such paths may include bends, if necessary, e.g., using lenses, mirrors and/or other optical components.

The output of sensor 44 is provided to processing module 46 which, in the preferred embodiment of the invention, performs only enough processing/amplification to output the signal (e.g., via cable 47) to a processing unit 48 that is distant from the hostile environment of the molten metal 12 and corresponding furnace in which it is held (e.g., 20–30 feet away). The processing unit 48 then performs all required processing to convert the signals received by sensor 44 into a meaningful measurement of the desired property. As a result, processing module 46 typically will be an entirely optical unit. For the same reasons, the signal provided from sensor 44 to processing module 46 usually will be optical, although it might instead be electrical or any other type of signal.

Processing module 46 may be configured to perform more than such basic signal processing, although as indicated above, most signal processing will be easier and less costly if performed at a remote location, such as processing unit 48. The tradeoffs between providing signal processing directly on sensor assembly 40 versus such a remote location (e.g., processing unit 48) will be apparent to those skilled in the art, and in practice the requisite processing (and the associated hardware and software) may be moved between such locations based on such tradeoffs.

At some point (preferably at remote processing unit 48) the detected signal generally will be converted into an electrical signal, which is then amplified, converted into digital form, and then processed digitally to obtain the desired measurement, using known physical relationships. In addition to a direct mathematical conversion of the measured signal to a value for the desired property, it may be preferable for processing unit 48 to make various corrections.

For example, as noted above, the rear end 33 and/or plane 31 of nozzle 30 is closed off with respect to the flow of gas 22. Any material used for this purpose preferably is transmissive and non-distorting with respect to the type of energy to be transmitted to and received from molten metal 12. However, to the extent that this is not the case, any attenuation or distortion preferably is measured, quantified and used by processing unit 48 to correct the data received from sensor 44. Similar corrections may need to be made to compensate for refraction caused by gas flow within nozzle 30 or within gas stream 24 or by any other component of system 10.

However, in alternate embodiments of the invention any or all of such corrections may be made by using optical components. For example, the barrier to gas flow at plane 31 or rear end 33 can, in certain embodiments, be constructed as a lens that compensates for any optical distortions.

The processing unit 48 generally will be provided with an analog-to-digital converter (ADC), a central processing unit (CPU), random access memory (RAM) and/or read-only memory (ROM), output interface circuitry for communicating with external devices and/or display interface circuitry and a display (e.g., a liquid crystal display) for displaying the measurement results. In addition, or instead, processing unit 48 may be provided with optical, chemical or biological processing components.

In operation, program steps, corresponding to the method steps described herein, typically are stored in either RAM or ROM and are executed by the CPU directly out of RAM or ROM in order to perform the desired processing. It should be understood that the present invention also encompasses machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

Depending upon the type of measurement being made, as well as engineering tradeoffs known to those skilled in the art, processing unit 48 may use any combination of real-time processing, lookup tables (e.g., 30 stored in ROM), or any other known techniques, to process the raw data input from sensor 44. In addition, processing unit 48 may provide control signals for controlling the operation of probe energy source 42 and coordinating its operation with that of sensor 44 and/or with gas stream 24. External interface cable 47 preferably permits external coordination between probe energy source 42 and sensor 44 in sensor assembly 40, and between the operation of sensor assembly 40 and the timing of the gas stream 24, as well as allowing sensor assembly 40 to provide its measurement data to other monitor and/or control devices. Thus, cable 47 may include one or more fiber optic cables and/or one or more electrical cables. The apparatuses and methods described above can permit remote sensing of properties of molten metal by creating a temporary hole through slag, gases, and/or any other interfering matter. In the preferred embodiment of the invention, the stream 24 of gas 22 is initiated, and the sensing operation (i.e., either passive sensing or transmission of probe energy followed by sensor detection) is delayed only by the minimum amount of time necessary to ensure that the stream 24 has penetrated through to the molten metal 12. As a result, any interference that may be caused by the gas 22 can be minimized. As indicated above, such interference might be a more significant concern when measuring certain parameters (e.g., temperature) that may be affected by prolonged or excess exposure of the molten metal to gas 22 than when measuring other parameters (e.g., spectral parameters) that generally will not be as sensitive to such exposure.

In a preferred embodiment of the invention in which the temperature of the molten metal 12 is to be measured, a Raytek Thermalert Marathon FR1 FiberOptic ratio thermometer is used for both the sensor assembly 40 and the processing unit 48. More specifically, the optical head of the FR1 functions as the sensor assembly 40, the electronics housing of the FR1 functions as at least a portion of processing unit 48, and the interconnecting fiber-optic cable functions as at least a portion of cable 47.

Additional Considerations.

In the foregoing embodiments, a stream of gas is used to punch a hole through slag and/or other interfering matter, thereby providing a path for remote sensing of various properties of the underlying molten metal. The stream of gas might be constant for the entire duration of the time that it is turned on or else might be varied. For example, ramping up the velocity of the gas might result in less slag being forced into the molten metal than simply turning the gas on at full pressure at the outset (which additional slag might potentially corrupt at least certain types of measurements). If such a ramp-up is in fact utilized, the ramp-up pattern and final gas velocity can be either determined in advance or controlled in real time using a feedback mechanism. In the latter type of embodiment, the gas velocity can, for example, be ramped up in connection with a first sensing operation (e.g., sonic echo) that is capable of distinguishing the molten metal from the slag; then, as soon as the molten metal is detected (indicating that the gas 22 has penetrated through the slag layer 14), a second sensing operation that is capable of detecting and measuring the parameter of interest (e.g., temperature) is initiated.

Also, in the embodiments described above, inlet 32 is disposed on the side of nozzle 30. However, it should be noted that this is not critical, and in alternate embodiments of the invention inlet 32 could be disposed at the rear end 33 of nozzle 30 (e.g., next to sensor assembly 40) or anywhere else on nozzle 30, provided that inlet 30 serves as an opening into channel 36.

As noted above, it often will be preferable to provide gas stream 24 only when needed for measuring a parameter. However, during other times it often still will be desirable to provide some positive (usually reduced) gas pressure in order to prevent contaminants from entering nozzle 30 and to otherwise keep nozzle 30 clean.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality may be ascribed to a particular module or component. However, unless any particular functionality is described above as being critical to the referenced module or component, functionality may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method for sensing a property of a molten metal that lies beneath a layer of interfering matter, said method comprising:

(a) propelling a stream of gas into the layer of interfering matter at a velocity that is sufficient for the gas to penetrate through the layer of interfering matter and into the molten metal, thereby providing an opening through the layer of interfering matter, wherein the interfering matter comprises a gaseous atmosphere and any other interfering matter, (b) during the performance of step (a), detecting and measuring energy emanating from the molten metal through the opening, so as to obtain an energy measurement; and (c) processing the energy measurement to determine a value for a property of the molten metal.

2. A method according to claim 1, wherein the energy emanating from the molten metal is infrared energy and the property is temperature of the molten metal.

3. A method according to claim 1, further comprising a step of radiating probe energy into the opening to stimulate emission of the energy from the molten metal.

4. A method according to claim 3, wherein the probe energy is produced by a laser.

5. A method according to claim 1, wherein a line of sight between a sensor used to perform step (b) and the molten metal is aligned with the stream of gas.

6. A method according to claim 5, wherein the sensor is an optical sensor.

7. A method according to claim 5, wherein the sensor includes a laser for radiating probe energy through the opening and into the molten metal to stimulate emission of the energy from the molten metal.

8. A method according to claim 7, wherein the sensor detects breakdown spectroscopy induced by the laser.

9. A method according to claim 5, wherein the sensor provides pyrometric evaluation of a temperature of the molten metal.

10. A method according to claim 1, wherein the interfering matter comprises slag.

11. A method according to claim 1, further comprising a step of varying an amount of the gas based on a property of the interfering matter.

12. A method according to claim 1, further comprising a step of varying a speed of the gas based on a property of the interfering matter.

13. A method according to claim 1, wherein a composition of the gas is selected based on the energy to be detected.

* * * * *